Aug. 20, 1957    T. W. MULLEN    2,803,284
TIRE REPAIR
Filed June 29, 1956
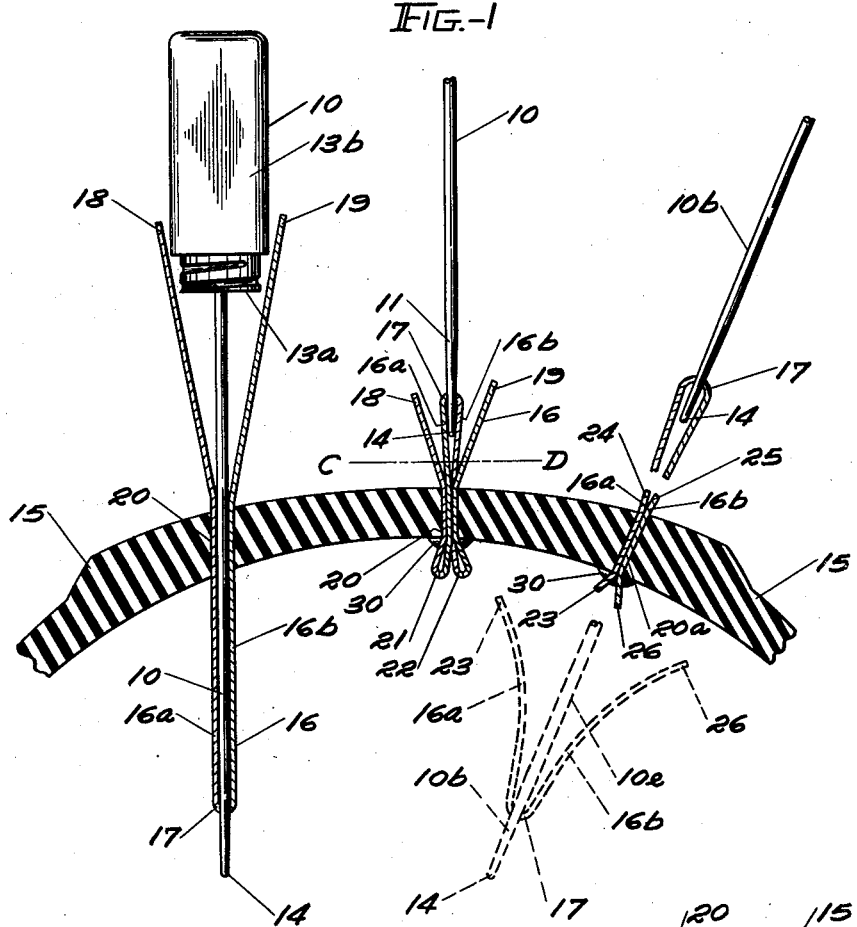
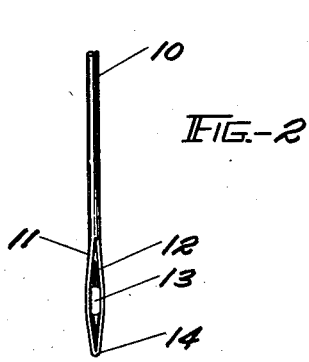
INVENTOR~
THOMAS W. MULLEN
By Herbert A. Winterry
ATTORNEY

United States Patent Office 2,803,284
Patented Aug. 20, 1957

2,803,284

TIRE REPAIR

Thomas W. Mullen, Evansville, Ind.

Application June 29, 1956, Serial No. 594,962

8 Claims. (Cl. 152—367)

This application is a continuation in part of my application, Serial No. 467,944, filed November 10, 1954.

This invention relates to a tire repair, particularly adapted to tubeless tires. With the advent of the tubeless tire, a new approach to repairing the tire such as when it has been punctured is required. Particularly is this true to avoid having to demount the tire from the rim more than is absolutely necessary so that the air seal between the bead of the tire and the rim flange is not broken nor damaged as it might be in removing the tire from the rim.

A primary purpose of course is to provide a repair whereby the tire will hold air without further leakage.

In accomplishing the primary object of the invention, it is a purpose to employ a repair member body which is easily and readily deformable laterally yet substantially non-stretchable longitudinally and which will in effect become a reinforcing member extending through the tire. A punctured hole in a tire is rarely a smooth walled hole but to the contrary is a tear producing irregular pits and projections. Therefore, a successful repair member must be readily, laterally deformable so that it may adjust itself by filling in and around these irregularities appearing along the wall of the puncture hole in effect cold flowing laterally since it is the repair member body and not a rubber plug, a cement, or a fluid filler in the absence of which must fill the hole primarily with the laterally deformable but longitudinally non-stretchable body to make a permanent repair. The invention does include a tacky or flowable medium carried on the primary body material, this medium being employed to air-seal the interstices between the fibers of the body material and also to air-seal off what irregular interstices may originally exist between the material and the wall of the puncture hole. This medium may further have the property of softening or dissolving to a slight extent the tire rubber in the wall about the puncture hole.

A still further important object of the invention resides in the simplicity of making the repair and also in the durability and long life thereof.

These and many other objects and advantages of the invention will become apparent to those versed in the art in the following description of one particular form of the invention as illustrated in the accompanying drawing, in which:

Fig. 1 is a view in radial section through a representative tire tread to which the invention is applied;

Fig. 2 is a view on an enlarged scale of the lower end of the tool employed in positioning the repair; and Fig. 3 is a detail in radial sectional view on an enlarged scale through a tire puncture hole with the invention applied.

The leak in the tire may be readily detected by running soap suds or any bubbly substance thereover. This can be done without taking the tire off of the rim on which the tire is mounted.

It is contemplated that the repair be made while the tire is normally inflated or at least still usably inflated although the repair may be readily made with the tire in a deflated condition. Preferably the tire is over-inflated in order to make the leak more readily apparent, and also to provide a greater expansion of the puncture hole so that when the air is allowed to escape back to normal pressure from the tire through the tire valve after the repair has been made, the hole will have a tendency to decrease in cross-section and allow the hole wall to compress against the repair which is inserted through the puncture hole. That is, the tire is preferably inflated until the puncture hole may be dilated beyond that caused by normal tire inflation so that there will be an increased gripping effect on the tire repair carried through that puncture hole upon the repair being subjected to normal operating pressure.

An awl 10 is provided with a lower end 11 widened and longitudinally cupped as at 12, to have a hole 13 therethrough. The lower end 14 is made somewhat blunt although it is tapered to a rounded point.

The repair itself comprises generally a length of twine wherein several strands of fibers may be loosely twisted together to form a "soft" twine. One important characteristic of the twine is that it be laterally compatible and readily deformable in cross-section, and easily displaceable laterally by the hole wall irregularities. The twine is preferably twisted so that there be spaces or interstices between strands and individual fibers to receive a coating. The twisting of the fibers in forming the twine provides a somewhat outer roughened surface with indentations therein, into which, portions of twine brought up thereagainst in another length may extend and interlock.

Another important characteristic of the twine is that it be substantially non-stretchable longitudinally of its length. Furthermore this material must be easily foldable through a sharp bend permitting the material to be folded back upon itself through a bend compressible or deformable laterally into the space not to exceed the thickness of two side by side lengths of the twine.

The term "twine" is employed herein in a generic sense, the term including string, cord, and yarn.

This twine may be made out of a number of materials including jute, hemp, silk, flax (linen), cotton, synthetic fibers or strands, and the like.

Preferably the surfaces of such twine are left in a rather rough state. That is, there are ends of the individual fibers protruding from the twine.

In any event, regardless of what twine material of this nature is selected, a second element of the tire repair is applied to the twine.

This second element consists of a film of material adhering to the twine and the fibers making up the twine, this film being employed as a medium for filling and air-sealing the interstices between fibers, and between strands, and between the twine and the surface of the puncture hole. It is to be understood that the twine primarily fills that hole and that the air-sealant while saturating the twine does not appreciably enlarge the over all diameter of the twine, but only is present essentially as a film coating. The twine remains as the cross-sectionally deformable and longitudinally non-stretchable body of the repair occupying the full volume of the puncture hole less the infinitesimal volume of the coating on the outer exposed surface of the twine. The coating material may be termed a bedding agent for the twine.

The second element of the tire repair medium may be any one or a mixture of a wide variety of substances. For example, the second element may be a mixture of rubber or rubber-like latex, pine rosin, petrolatum, and a petroleum solvent such as gasoline. It may be any one of the following materials; a synthetic rubber-like plastic; rubber, synthetic or natural, cured or semi-cured, with an accelerater added if desired; slightly decomposed rubber; a bitumen alone or mixed with a rubber-like latex; a bitumen with a filler such as ground or finely divided cork, rubber, or fibrous material such as asbestos. Any elastomer is usable.

The common essential characteristic of these materials constituting the second element is that the material must be deformable, preferably elastically so, whether in a fluid or solid state, and that this characteristic remains through the wide range of temperatures within which tires are required to operate. This characteristic embodies the factors of softness, flexibility and pliability.

In the fluid type of this second element, it would be gummy, highly viscous, and yet flowable within and around the twine when squeezed and gripped under the elasticity of the rubber of the tire about the puncture hole. In the solid state, such as in rubber cured or semi-cured the material, the same as the fluid type, is practically incompressible, but is deformable and flowable under stress, the volume of the material in either case remaining practically constant although flowed into different shapes as determined by the change in shape under usage by the wall about the puncture hole. The hole, with the repair inserted therethrough, becomes in effect, a closed off vessel with ends of the twine presented at each end. The extent of deformation of this second element is therefore controlled largely by the extent of deformation of the twine element. It is considered for the purpose of description herein that the cured rubber and the other forms of rubber are flowable into deformed states and flow back elastically into their original condition. The more fluid-like materials should have a tacky consistency for high adherence to the twine fibers, the exposed edges of the fabric in the tire, and the surface of the puncture hole.

The impregnating material is not primarily a cement although it may incidentally assume that function. The important feature, in summary, is that it is flowable laterally of the twine under the enveloping pressure of the wall of the puncture hole while the constrictive force on the twine resists longitudinal flow in quantity therealong, although the twine when constricted may serve as a wick through which some longitudinally induced flow may occur as will hereinafter be explained. The air-sealant substance thus remains within the confines of the puncture hole cavity flexing and flowing about therein under flexing and centrifugal forces set up in tire usage.

The air-sealant impregnated twine is cut into lengths of from ten to twelve inches although these lengths are not critical. These lengths of the impregnated twine are preferably packed in foil in sealed tubes to reduce exposure to the atmosphere until the repair is to be made. A content of petrolatum may be used as an effective setting-up retardent with a subsequent use.

A length of such twine has an end inserted through the hole or eye 13 of an awl 10 and brought up along the shank in substantially equal lengths such as is suggested in Fig. 1 in the left-hand portion of that view. The distance from the awl eye 13 to a gage line spaced from the eye 13 along the awl shank, such as the lower end 13a of the handle 13b, is such that the end portions 18 and 19 terminate approximately at that line.

When the puncture has been located in the tire 15, the blunt end 14 is entered into the puncture with the twine 16 carried upwardly therealong and the awl is pushed downwardly to carry the loop 17 of the twine 16 within the tire 15 to have the gage line 13a strike the tire 15 as an insertion limit whereby the loop 17 is positioned well within the tire 15 and the short end lengths 18 and 19 are left exposed on the outer side of the tire 15. These lengths may be in the neighborhood of from one to one and one half inches.

The twine 16, particularly if there is a grease, such as petrolatum, content in the second element is rather easily applied by forcing the point 14 of the awl 10 down through the puncture hole in the tire 15 to carry the loop 17 within the tire although the awl point may be readily inserted in the absence of the lubricant. When that has been accomplished, the awl 10 is pulled back out of the tire a certain distance. This operation is illustrated in Fig. 1 to the right of the awl 10 where it has been initially inserted through the tire 15. When the awl 10 is pulled upwardly and out through the casing, the twine 16 having had the single loop 17 carried within the tire, is looped back upon itself so that each length of the twine 16a and 16b is in turn looped upon itself. In so doing, portions of these lengths 16a and 16b are pulled back through the hole designated by the numeral 20 whereby two loops 21 and 22 are formed in these lengths, both left within the tire.

The withdrawal of the awl 10 from the tire 15 is limited to that degree whereby these loops 21 and 22 are left inside of the tire 15 as indicated. Then the two end portions 18 and 19 and also the exposed portions of the lengths 16a and 16b are cut off on some such line as line CD, the line CD being preferably at the outer surface of the tire.

This will leave four ends or tufts of the twine exposed on the outside of the tire 15, while the loops 21 and 22 remain on the inside. These outer ends will soon wear off, and in fact may wear down to leave a slight cup indentation in respect to the outer surface of the tire 15. This is preferable, so that there will be no tendency for the ends to remain exposed and possibly drag on surfaces when the tire is abruptly stopped in ordinary usage.

The insertion of the awl and the original lengths 16a and 16b through the puncture 20 does not enlarge that hole 20 but simply while inserted dilates and elastically crowds back the rubber of the tire. Neither does that operation further enlarge the fabric or cord break caused by the puncture. Then when the awl is withdrawn, after it has carried the lengths 16a and 16b through the tire 15, it pulls those lengths back up through the same hole filling in the expanded opening set up by the forcing of the awl 10 therethrough, so that in the end, there are actually four lengths of twine extending through the hole 20 with the sealing-over loops 21 and 22 on the inside and the free four ends of the twine outside.

The lubricant if employed on the twine surface when it is inserted through the hole 20 is to a great extent scraped off as the twine passes through the hole 20. However any grease remaining or mixed in the coating does not interfere with any sealing action but rather aids in that the grease will dissolve the tire rubber about the hole wall to a small degree permitting that tire rubber to flow about and against the twine into more intimate contact in the presence of the air-sealant substance. The tackiness of the twine fluid type coating substance helps the twine fibers to inter-embed themselves with the substance to form an air-tight core, and at the same time come intimately close with the rubber of the tire.

Thus it is to be seen that the tire may be repaired by carrying the twine down through the puncture opening by the awl and then withdrawing the awl and cutting off the outer exposed portions of the twine. That is the entire operation of making the repair. It can readily be carried out by the car driver wherever he may encounter a puncture, all without having to remove the wheel from the car and the tire from the wheel rim.

Noting the right-hand position of the awl designated by 10b, the awl 10b, has been carried by its lower end through the tire 15 to some such position as indicated by position 10e, wherein the twine 16 (having a length shorter than that shown in the left-hand position of the awl insertion) in its entirety is carried through the puncture 20a entirely within the tire 15 so that, at the insertion (dash lines), only the awl 10b is within the puncture hole 20a. Then the awl 10b is pulled outwardly to the solid line position, a distance limited to that whereby the ends 26 and 23 will remain within the tire 15 and the point 14 of the awl 10b is entirely outside of the tire 15, whereupon the twine is cut off to leave the free ends 24 and 25 presented exteriorly of the tire 15. Therefore it is to be seen that in this instance, there are but two twine lengths extended through the hole 20a. This form or method is employed wherein the puncture hole 20a is relatively smaller in diameter than is the hole 20. In this case, there will be no loops between the lengths 16a and 16b, but there will be the free end portions 26 and 23 wherein the tire 15 which will effectively prevent any tendency of the two lengths to travel longitudinally or radially through the tire wall 15 in actual usage. It is to be remembered that the portions of these lengths 16a and 16b which are confined within the hole 20a are very positively gripped by the compressive action of the rubber surrounding the hole 20a together with the cords which may be present. This in effect causes the effective diameter of the combined lengths 16a and 16b of the twine to be less than is the combined diameters of the free end portions 26 and 23 which are not subjected to this compressive, laterally directed force.

Regardless of whether there be two or more strands of twine carried through the puncture hole, the particular characteristics of the twine of softness, non-stretching longitudinally, deformable, and compactible laterally or in cross-section with its air-sealant element added, set up the action in which the twine is deformed to conform locally to the puncture hole wall irregularities—bending over projections, pressing into hollows, squeezing together in small diameter sections and filling larger sections, and infiltrating with broken ends of the tire cords presented at the hole wall as well as extending by frayed ends therein, with the air-sealant element cold flowing and filling in any interstices within the twine and between it and the hole wall irregularities, as indicated in Fig. 3.

The result of that action is that the twine is seized by the hole wall under urge of the rubber of the tire compressed in a zone around the hole wall when the awl is withdrawn, and this seizing is not around a cylindrical wall, but in a tortuous, most irregular shaping of the twine, all to the end that the twine in the hole—four strands or two strands—is so gripped in an interlocking manner, particularly in a zone intermediate the inner and outer faces of the tire, that the twine can not crawl longitudinally under hinge action of the tire tread, or under centrifugal force even when the tire is turning under load either at lower speeds or at high speeds.

This gripping action (not dependent on the air-sealant element) is in decided contrast to what is sometimes observed in heretofore repairs consisting of a rod or cylindrical length of rubber which, in order to be inserted in the puncture hole, has to be in the same order of resiliency as that of the rubber of the tire. The rubber plug, even through it may have ends exposed as heads on the outer and inner tire faces, being elastic and gripped within the wall of the hole tends to "walk" toward the ends of the hole reducing in cross-sectional area, whereas the twine remains fixed in area.

Then, an important feature of the repair is found in the fact that, when the twine strands are pulled through the puncture hole from the inside toward the outside of the tire, there is a build-up of the air-sealant, designated by the numeral 30, around the exposed ends of the twine of the tire inner face, due to squeezing and stuffing action. Under tire usage, this build-up constitutes a reservoir of the sealant. But a greater reservoir of the air-sealant material exists within and on the inner loops 21 and 22 in the one example, and the end portions 23 and 26 in the other example. From this combined reservoir, the sealant is urged, under centrifugal action of the rotating tire, compressively about and into the twine which, also serving as a wick, feeds the sealant into the twine over a long period of operation. Even with use of semi-cured or cured rubber as the air-sealant, this build-up occurs and the centrifugal pressure is effective in maintaining the air sealed condition.

Reference has been made above to air-sealant carrying solids such as cork, rubber, and fibers removed from the twine fibers and the like. Even sand would be operable. The solids would be in discrete particles and not in a flour-like powder state. When such foreign matter is incorporated in the air-sealant substance, this matter will become imbedded in the twine small enough in particle size to work into the twine between its fibers and also tend to force itself into the puncture hole wall under the laterally directed restrictive wall pressure. In so doing, not only are interstices and voids filled, but there is an interlocking action set up between the deformed twine and the deformed hole wall. Furthermore the foreign matter tends to restrict centrifugal action effect normally flowing the air-sealant longitudinally of the twine. This action further insures that stresses on the twine longitudinally thereof are confined to the innumerable localized zones of the solid matter particles interlocking the twine and hole wall so that overall, longitudinally directed stress on the twine is limited to practically nothing, and the longitudinally non-stretchable characteristic is not overcome to such a degree that would tend to rupture the twine.

While I have herein shown and described my invention in the one particular form, it is obvious that changes may be employed without departing from the spirit of the invention, and I therefore do not desire to be limited to that precise form beyond the limitations which may be imposed by the following claims.

I claim:

1. In combination with a tubeless tire having a puncture hole, a tire repair comprising a fibrous twine material composed of interengaged individual fibers substantially non-stretchable longitudinally of a length thereof, said material filling said hole to be in substantial contact with the wall thereof, the material having said fibers generally disposed longitudinally of the hole; and said tire repair also having a flowable plastic material initially interspersed between and coating said fibers prior to insertion into the hole of the twine material and filling and air-sealing the interstices between the fibers of the twine material; said plastic material comprising a member of the group of natural rubber, synthetic rubber, a bitumen and oil mixture, and a rubber pine-rosin petrolatum mixture; said plastic material being characterized by remaining soft and flexible.

2. The structure of claim 1 in which said fibrous material comprises in twine form a member of the group of hemp, jute, cotton, flax, and synthetic fibers.

3. The structure of claim 1 in which discrete particles of solid materials are embedded in and are dispersed throughout said plastic material retarding flow of the plastic material longitudinally of said hole.

4. The structure of claim 1 in which a grease is added to said plastic material.

5. The combination with a tubeless tire constituting an inherently resilient carcass of rubber and substantially non-stretchable fabricated cords, and having a puncture hole therethrough bounded by an irregularly shaped wall of rubber and cord ends and lengths: of a tire repair comprising non-elastic, soft, fibrous twine material composed of individual fibers loosely assembled, primarily longitudinally of the twine and being substantially non-stretchable longitudinally and readily compactible laterally of a length thereof; said twine extending longitudinally through and substantially filling said hole, the inherent resilience of the carcass causing the twine to conform laterally to said irregularly presented wall thereof; and a flowable plastic air-sealant initially carried by said twine prior to entering said hole, coating said fibers and filling the interstices therebetween and contacting said hole wall; said air-sealant being characterized by being tacky during normal tire life.

6. The structure of claim 5 in which said air-sealant is a hardening-inhibited synthetic plastic.

7. The structure of claim 5 in which there are a plurality of side by side lengths of said twine extending through said hole and said lengths are folded back upon themselves within said tire externally of the hole and defining loops of the twine; said loops carrying said air-sealant and constituting a reservoir in those loops of air-sealant externally of the hole and in continuity with the air-sealant within the hole, supplying a feed back of the air-sealant along the twine to within the hole under usage of the tire.

8. The combination with a tubeless tire inherently resilient and having a puncture hole with an irregular wall therethrough, of a tire repair sealing said hole comprising a substantially non-stretchable length of fibrous twine substantially filling said hole; the resiliency of said tire causing said twine to conform laterally of the hole to said wall; said twine having a length protruding within the tire from the hole; a flowable air-sealant coating the fibers of said twine and filling the interstices therebetween throughout the length thereof; and a reservoir of said air-sealant carried by said protruding length adapted to flow back about said fibers.

References Cited in the file of this patent

UNITED STATES PATENTS

| | | |
|---|---|---|
| 553,562 | Mix | Jan. 28, 1896 |
| 602,052 | Brauchler | Apr. 12, 1898 |
| 610,594 | Whitbeck | Sept. 13, 1898 |
| 682,401 | Bolton | Sept. 10, 1901 |
| 725,171 | Sutton | Apr. 14, 1903 |
| 1,456,403 | Ranney | May 22, 1923 |
| 1,606,602 | Stauffer | Nov. 9, 1926 |
| 1,619,538 | Pawsat | Mar. 1, 1927 |
| 1,766,333 | Forehand | June 24, 1930 |
| 2,601,394 | Hansen | June 24, 1952 |

FOREIGN PATENTS

| | | |
|---|---|---|
| 160,359 | Great Britain | Mar. 24, 1921 |